(12) United States Patent
Shirouzu et al.

(10) Patent No.: US 11,827,449 B2
(45) Date of Patent: Nov. 28, 2023

(54) MOVER, CARRIER, MOVING SYSTEM, AND MOVING METHOD

(71) Applicant: Panasonic Intellectual Property Management Co., Ltd., Osaka (JP)

(72) Inventors: Hiroshi Shirouzu, Shiga (JP); Osamu Mizuno, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1151 days.

(21) Appl. No.: 16/430,571

(22) Filed: Jun. 4, 2019

(65) Prior Publication Data

US 2019/0389673 A1    Dec. 26, 2019

(30) Foreign Application Priority Data

Jun. 22, 2018  (JP) ................ 2018-119359

(51) Int. Cl.
| | |
|---|---|
| *B65G 1/06* | (2006.01) |
| *B65G 1/04* | (2006.01) |
| *G05B 19/418* | (2006.01) |
| *B62D 57/024* | (2006.01) |
| *B62D 57/04* | (2006.01) |
| *H01F 7/02* | (2006.01) |

(Continued)

(52) U.S. Cl.
CPC ........... *B65G 1/065* (2013.01); *B62D 57/024* (2013.01); *B62D 57/04* (2013.01); *B62D 63/04* (2013.01); *B65G 1/0485* (2013.01); *B65G 1/0492* (2013.01); *G05B 19/41895* (2013.01); *H01F 7/02* (2013.01); *H01F 7/206* (2013.01)

(58) Field of Classification Search
CPC .... B65G 1/0492; B65G 1/0485; B65G 1/065; B62D 57/024; B62D 57/04; B62D 63/04; G05B 19/41895; H01F 7/206; G05D 2201/0216
See application file for complete search history.

(56) References Cited

U.S. PATENT DOCUMENTS

| | | | |
|---|---|---|---|
| 2016/0075511 A1* | 3/2016 | Poulin ................. | B65G 1/0435 414/800 |
| 2016/0236867 A1* | 8/2016 | Brazeau ................. | B25J 5/007 |

(Continued)

FOREIGN PATENT DOCUMENTS

JP        2012-053838 A        3/2012

*Primary Examiner* — Thomas Randazzo
(74) *Attorney, Agent, or Firm* — PEARNE & GORDON LLP

(57) ABSTRACT

A mover according to the present disclosure includes: a body to move; a second member; a suction unit; a location detection unit; a first moving part, and a second moving part. The second member moves in a state where the second member is combined with a first member provided for an object, as the body is displaced relative to the object. The suction unit is sucked to the object in the state where the second member is combined with the first member. The location detection unit detects a location of the body with respect to the object by detecting movement of the second member. The first moving part moves the body until the state where the second member is combined with the first member is established. The second moving part displaces the body relative to the object in the state where the second member is combined with the first member.

20 Claims, 8 Drawing Sheets

(51) Int. Cl.
   *B62D 63/04*   (2006.01)
   *H01F 7/20*    (2006.01)

(56) References Cited

U.S. PATENT DOCUMENTS

2018/0305122 A1* 10/2018 Moulin ................ B65G 1/0492
2019/0359423 A1* 11/2019 Lee .................... B65G 1/0492
2020/0339350 A1* 10/2020 Dooley ................ B65G 1/0492
2021/0009350 A1*  1/2021 Cohen .................. B65G 1/065

* cited by examiner

MOVER, CARRIER, MOVING SYSTEM, AND MOVING METHOD

CROSS-REFERENCE TO RELATED APPLICATION

This application claims the benefit of foreign priority to Japanese Patent Application No. 2018-119359 filed on Jun. 22, 2018, which is assigned to the assignee of the present application and the entire contents of which are hereby incorporated by reference for all purposes.

TECHNICAL FIELD

The present disclosure generally relates to a mover, a carrier, a moving system, and a moving method, and more particularly relates to a mover configured to move around in a given space, a carrier, a moving system, and a moving method.

BACKGROUND ART

JP 2012-53838 A (hereinafter referred to as "D1") discloses an unmanned carrier vehicle (mover) designed to move within a traveling area in accordance with route data.

When unloading a burden from itself onto shelving or being loaded with a burden removed from the shelving, for example, the unmanned carrier vehicle of D1 needs to be positioned accurately with respect to the shelving. Thus, there is a growing demand for accurately detecting the location of the unmanned carrier vehicle (or its body) with respect to the shelving (object).

SUMMARY

The present disclosure provides a mover, a carrier, a moving system, and a moving method, all of which are configured or designed to improve the accuracy of location detection with respect to the object.

A mover according to an aspect of the present disclosure includes: a body to move; a second member; a suction unit; a location detection unit; a first moving part, and a second moving part. The second member moves, in a state where the second member is combined with a first member provided for an object, as the body is displaced relative to the object. The suction unit is sucked to the object in the state where the second member is combined with the first member. The location detection unit detects a location of the body with respect to the object by detecting movement of the second member. The first moving part moves the body until the state where the second member is combined with the first member is established. The second moving part displaces the body relative to the object in the state where the second member is combined with the first member.

A carrier according to another aspect of the present disclosure carries a burden using the mover. The body includes a holder to hold the burden.

A moving system according to still another aspect of the present disclosure includes: the mover; and the object.

A moving method according to yet another aspect of the present disclosure includes: first moving processing; suction processing; second moving processing; and detection processing. The first moving processing includes moving a mover until a state where the mover is combined with an object is established. The suction processing includes having the mover sucked to the object in the state where the mover is combined with the object. The second moving processing includes displacing the mover relative to the object with the mover sucked to the object. The detection processing includes detecting a location of the mover with respect to the object.

DESCRIPTION OF EMBODIMENTS

Embodiment (1.1) Overview

Figure 1:
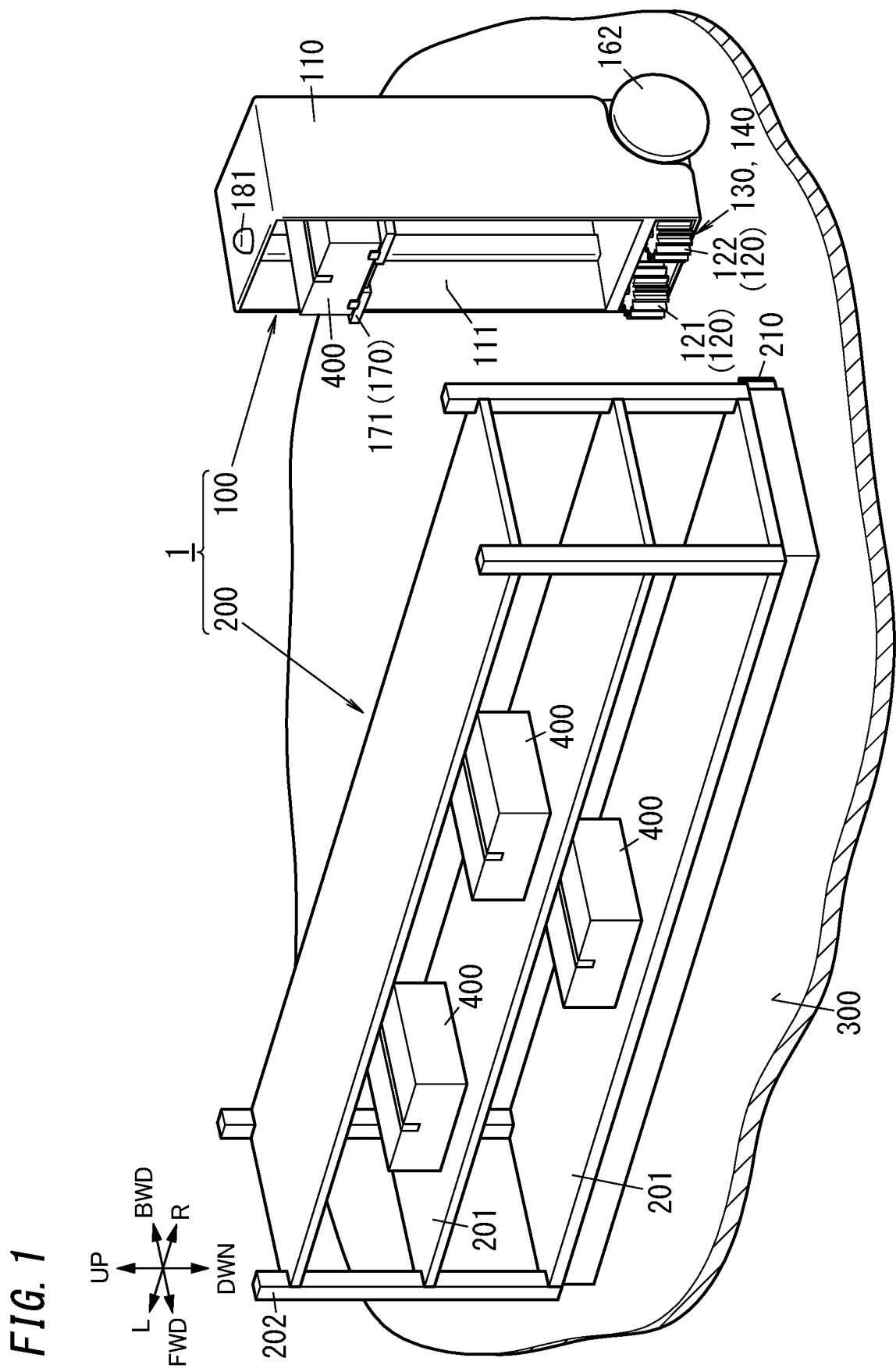
FIG. 1 is a schematic perspective view, as viewed from the object, of a moving system including a mover according to an exemplary embodiment of the present disclosure.

A mover 100 according to an exemplary embodiment is a vehicle designed to travel on a traveling surface 300 on a plurality of wheels 162 as shown in FIG. 1. The mover 100 may be introduced into distribution centers (including parcel shipping centers), factories, offices, stores, schools, hospitals, and various other facilities to travel on the floor surface of the facility as the traveling surface 300. In the following description of embodiments, the mover 100 is implemented as a "carrier" for carrying a burden 400.

A mover 100 according to this embodiment includes a body 110 to move; a second member (such as a pinion gear 120); a suction unit 130; a location detection unit 140; a first moving part (such as a traveling device 160), and a second moving part (such as a driving unit 150).

The second member moves, in a state where the second member is combined with a first member (such as a rack 210) provided for an object (such as multi-shelf shelving) 200, as the body 110 is displaced relative to the object 200.

The suction unit 130 is sucked to the object 200 in the state where the second member is combined with the first member. Note that even when the suction unit 130 is sucked to the object 200, movement is still transmissible between the first member and the second member.

The location detection unit 140 detects the location of the body 110 with respect to the object 200 by detecting the movement of the second member.

The first moving part (traveling device 160) moves the body 110 until the state where the second member is combined with the first member is established.

The second moving part (driving unit 150) displaces the body 110 relative to the object 200 in the state where the second member is combined with the first member.

As used herein, the state where the first member and the second member are combined with each other refers to a state where the first and second members are combined with each other such that the movement of one of the first and second members is transmitted to the other. The mover 100 is driven by the second moving part along the length of the object 200 (more specifically, along the length of the first member provided for the object 200) in the state where the first moving part's driving the body 110 allows the second member to be combined with the first member provided for the object 200. The object 200 is an object arranged on the traveling surface 300 on which the mover 100 travels and is an object that allows the mover 100 to move along the first member provided for the object 200. In this embodiment, the object 200 is shelving to put burdens 400 thereon. The mover 100 moves along the shelving to any desired position where the mover 100 is to be loaded with a burden 400 removed from the shelving, or to unload a burden 400 from itself onto the shelving.

In the mover 100 according to this embodiment, as the body 110 moves relative to the object 200 in the state where the second member is combined with the first member, the second member is moved by the first member. Therefore, the location detection unit's 140 detecting the movement of the second member allows the location of the body 110 to be detected with respect to the object 200. In this case, the location detection unit 140 is able to detect, in the state where the second member is combined with the first member (i.e., with the interval between the object 200 and the body 110 maintained at a predetermined value), the location of the body 110 with respect to the object 200 along the length of the object 200. This allows the location detection unit 140 to more accurately detect the location of the body 110 with respect to the object 200, compared to a state where the interval between the object 200 and the body 110 is indefinite.

In addition, the mover 100 according to this embodiment is also used as a carrier. That is to say, the carrier according to this embodiment is a carrier that uses the mover 100, and the body 110 includes a holder (a mount 171) for holding the burden 400. As used herein, "holding" the burden 400 refers to a state where the body 110 holds the burden 400 so as to be ready to carry the burden 400 to a specified location. In this embodiment, the burden 400 is held so as to be mounted on the mount 171. However, this is only an example and should not be construed as limiting. Alternatively, the burden 400 may also be held so as to be suspended.

In the carrier according to this embodiment, the location detection unit 140 is allowed to more accurately detect the location of the body 110 with respect to the object 200, thus improving the accuracy of positioning with respect to the object 200. Therefore, even when the burdens 400 are arranged at narrower intervals, the carrier is still able to be loaded with, or unload, the burdens 400 easily.

Also, a moving system 1 according to this embodiment includes the mover 100 described above and the object 200.

The moving system 1 according to this embodiment allows the location of the body 110 to be detected more accurately with respect to the object 200.

(2) Details

Next, a mover 100 according to this embodiment and a moving system 1 including the mover 100 and the object 200 will be described with reference to FIGS. 1-6D. In the following description, the respective directions will be defined as indicated by the "UP," "DWN," "L," "R," "FWD," and "BWD" arrows in FIGS. 1, 3, and other drawings. However, this is only an example and these arrows should not be construed as limiting the directions in which the mover 100 is used.

(2.1) Configuration (2.1.1) Object

Figure 3:
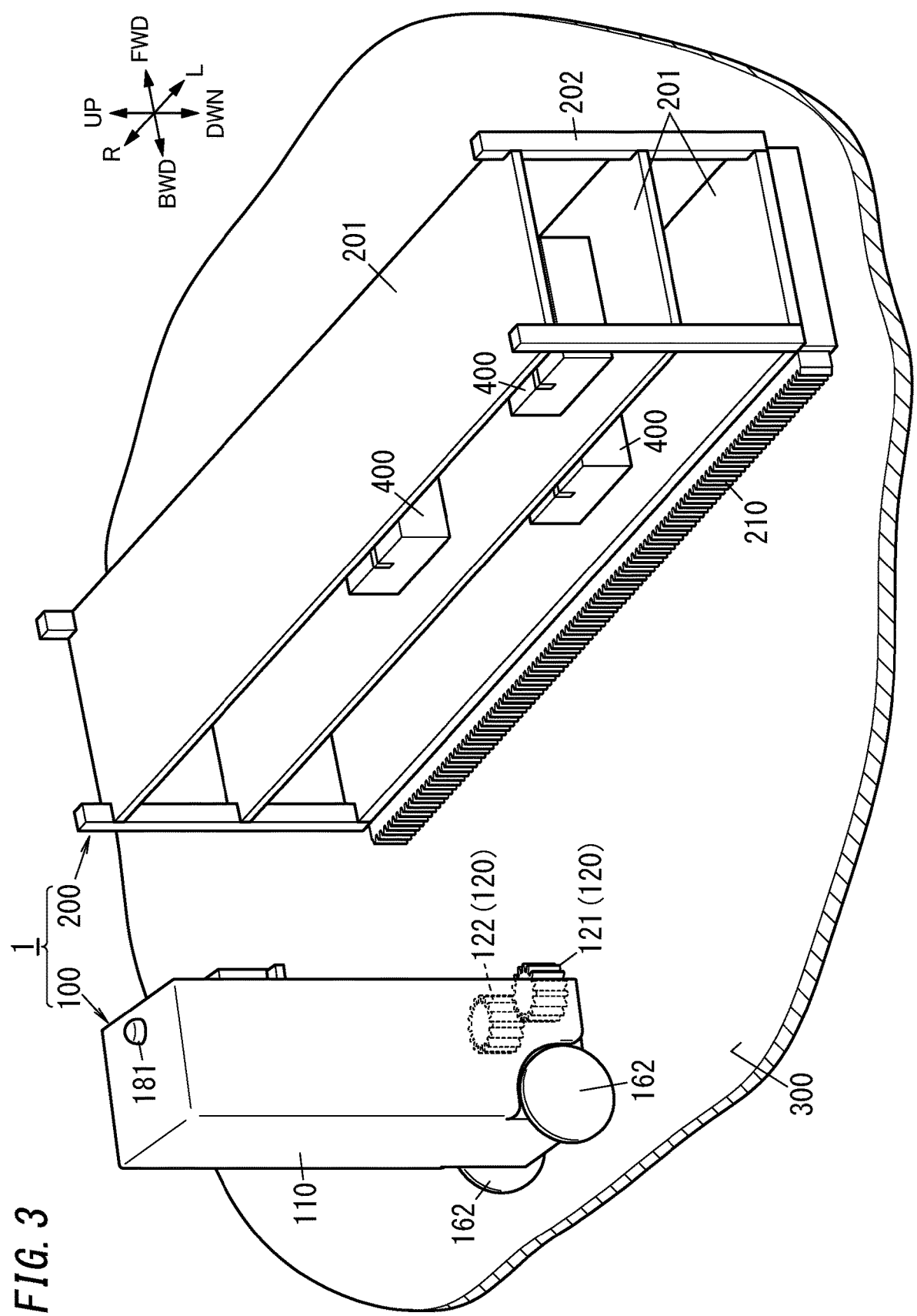
FIG. 3 is a schematic perspective view, as viewed from the mover, of the moving system.
Figure 4:
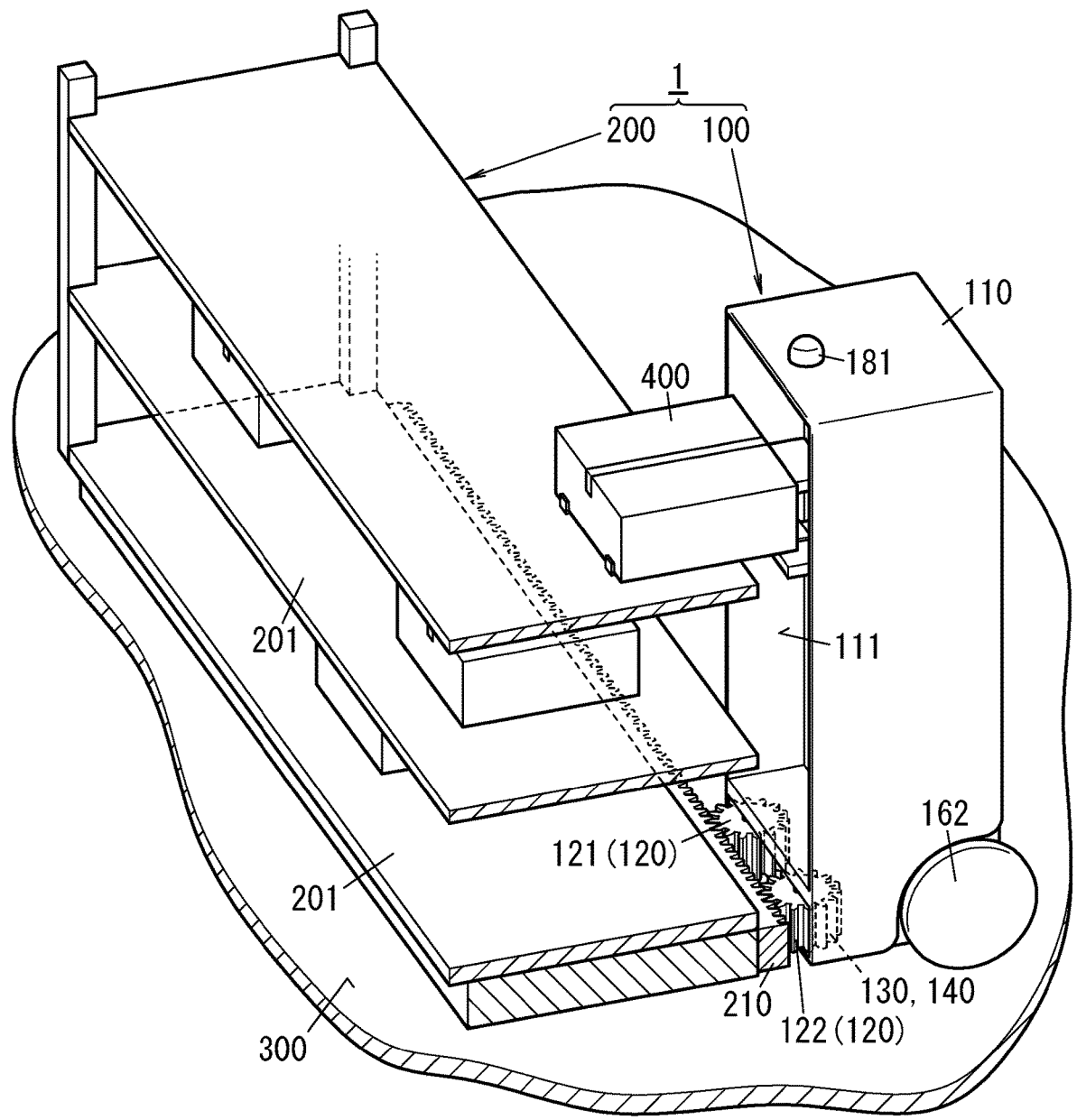
FIG. 4 is a schematic perspective view illustrating how the mover moves along the object in the moving system.

In this embodiment, the object 200 is a multi-shelf shelving (see FIGS. 1 and 3). The object 200 includes a plurality of (e.g., three) shelves 201 in a rectangular plate shape and a plurality of (e.g., four) poles 202 for supporting the plurality of shelves 201. A single or a plurality of burdens 400 may be put on each of these shelves 201.

On a lower part of the object 200, provided as the first member is a rack 210, which is arranged to extend along the length of the bottom shelf 201. The rack 210 is a linear gear, of which the teeth are arranged along the length of the shelf 201.

Note that the number, dimensions, shape, and other parameters of the shelves (or shelving) that form the object 200 may be changed as appropriate. In addition, the object 200 does not have to be such shelving to put the burdens 400 thereon. Alternatively, the object 200 may also be a member with the rack 210, provided separately from the shelving to put the burdens 400 thereon, which is arranged along the length of the shelving.

(2.1.2) Mover

Figure 2:
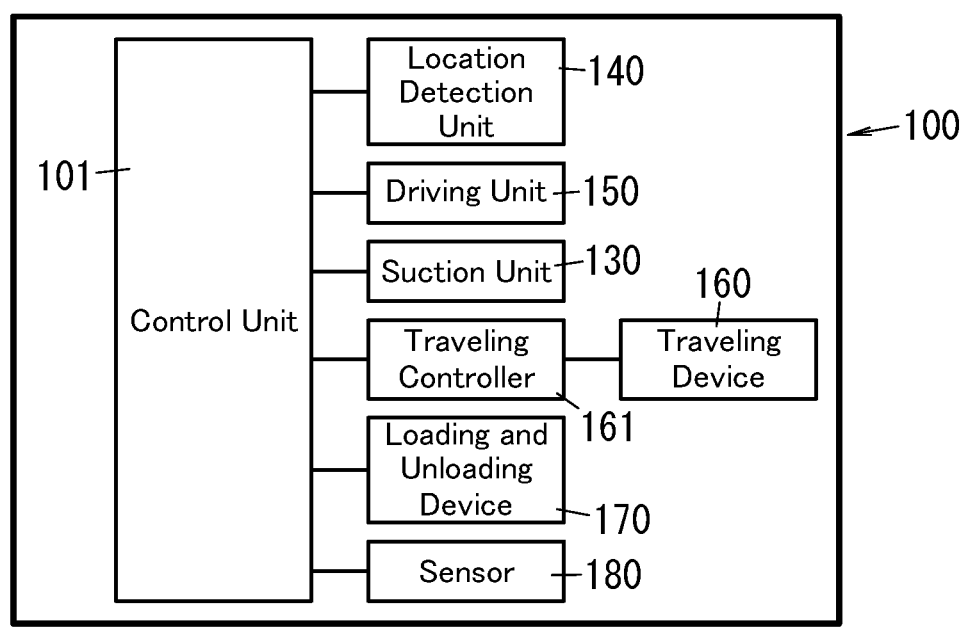
FIG. 2 is a block diagram of the mover.

As already described for the "(1.1) Overview" section, the mover 100 includes the body 110, the second member (such as a pinion gear 120), the suction unit 130, and the location detection unit 140 (see FIGS. 1 and 2). The mover 100 further includes a control unit 101, a driving unit 150, a traveling device 160, a traveling controller 161, a loading and unloading device 170, and a sensor 180. These constituent elements of the mover 100 will be described one by one.

The control unit 101 performs overall control on the mover 100. The control unit 101 controls, in accordance with the results of detection by the location detection unit 140 and the sensor 180, for example, the suction unit 130, the driving unit 150, the traveling device 160, and the loading and unloading device 170. In this embodiment, the control unit 101 is implemented as a microcontroller including, as its major components, at least one processor and at least one memory. In other words, the microcontroller, including a processor and a memory, performs the function of the control unit 101 by making its processor execute a program stored in its memory. The program may be stored in advance in the memory or may also be downloaded via a telecommunications line such as the Internet or distributed after having been stored on a non-transitory storage medium such as a memory card.

The body 110 includes a vertically elongated, metallic body in the shape of a rectangular parallelepiped. One side (e.g., the front side) of the body 110 has an opening, which forms almost the entirety of that side and through which the burdens 400 are introduced into a storage space 111 provided inside of the body 110.

To the lower part of the body 110, mounted are a plurality of wheels 162, which are constituent elements of the traveling device 160. These wheels 162 allow the body 110 to travel on the traveling surface 300. Each of these wheels 162 is an omnidirectionally turning wheel such as an omni-wheel. Turning these wheels 162 allows the body 110 to move in every direction (i.e., forward, backward, leftward, and rightward) on the traveling surface 300. The operation of the traveling device 160 is controlled by the traveling controller 161. The traveling controller 161 controls the operation of the traveling device 160 in accordance with a control signal supplied from the control unit 101. The traveling device 160 allows the body 110 to travel. That is to say, the first moving part for moving the body 110 until the state where the second member is combined with the first member is established includes the traveling device 160.

In the lower part of the front surface of the body 110 (i.e., the part under the storage space 111), arranged rotatably is a pair of pinion gears 120 (121, 122) as the second member to be combined with the rack 210 of the object 200. The pair of pinion gears 120 (121, 122) are arranged on the left and right sides, respectively, in the lower part of the front side of the body 110. That is to say, the mover 100 includes a plurality of second members (pinion gears 120), which are arranged in the direction in which the body 110 is displaced relative to the object 200 (i.e., the rightward/leftward direction) in a state where the plurality of second members are combined with the first member (rack 210). In the following description, if the pair of pinion gears 120 need to be distinguished from each other, the left pinion gear 120 will be hereinafter referred to as a "pinion gear 121" and the right pinion gear 120 as a "pinion gear 122." Moving the mover 100 either to the right or to the left along the rack 210 with the pair of pinion gears 121 and 122 combined with the rack 210 of the object 200 (see FIG. 4) allows the pinion gears 121 and 122 to rotate by an angle of rotation corresponding to the distance traveled by the mover 100.

The storage space 111 of the body 110 is provided with the loading and unloading device 170 for removing or placing the burdens 400 from/onto the shelving as the object 200. The loading and unloading device 170 includes the mount 171 for mounting the burden 400 thereon, a horizontal moving mechanism for shifting the mount 171 forward or backward, and an elevating mechanism for shifting the mount 171 upward or downward. The loading and unloading device 170 is allowed to perform the operation of mounting the burden 400, removed from one of the shelves 201, onto the mount 171 and storing the burden 400 in the storage space 111 by making the horizontal moving mechanism and the elevating mechanism shift the mount 171 (see FIG. 4). The loading and unloading device 170 is also allowed to perform the operation of unloading the burden 400 that has been mounted on the mount 171 and stored in the storage space 111 onto one of the shelves 201 by making the horizontal moving mechanism and the elevating mechanism shift the mount 171. In this case, the operation of the loading and unloading device 170 is controlled by the control unit 101.

The sensor 180 detects the situation surrounding the mover 100 and outputs the result of detection to the control unit 101. The sensor 180 includes an image sensor 181 mounted on the top of the body 110, for example. The image sensor 181 includes a complementary metal oxide semiconductor (CMOS) image sensor or any other image sensor, which captures the situation surrounding the mover 100 and output image data thus obtained to the control unit 101. Note that the sensor 180 does not have to include the image sensor 181 but may also include at least one selected from the group consisting of the image sensor 181, a sonar sensor, a radar, and a light detection and ranging (LiDAR) sensor. Optionally, the sensor 180 may also include a positioning unit for detecting the current location using a global positioning system (GPS), a local positioning system (LPS), or any other positioning system. If necessary, the sensor 180 may also include an acceleration sensor, a gyrosensor, or any other type of sensor.

The suction unit 130 is sucked to the object 200 in the state where the pinion gears 120 as the second members are combined with the rack 210 as the first member. In this embodiment, the rack 210 and the pinion gears 120 are made of a magnetic material (such as a metallic material) and the suction unit 130 is magnetically sucked to the object 200.

Figure 5A:
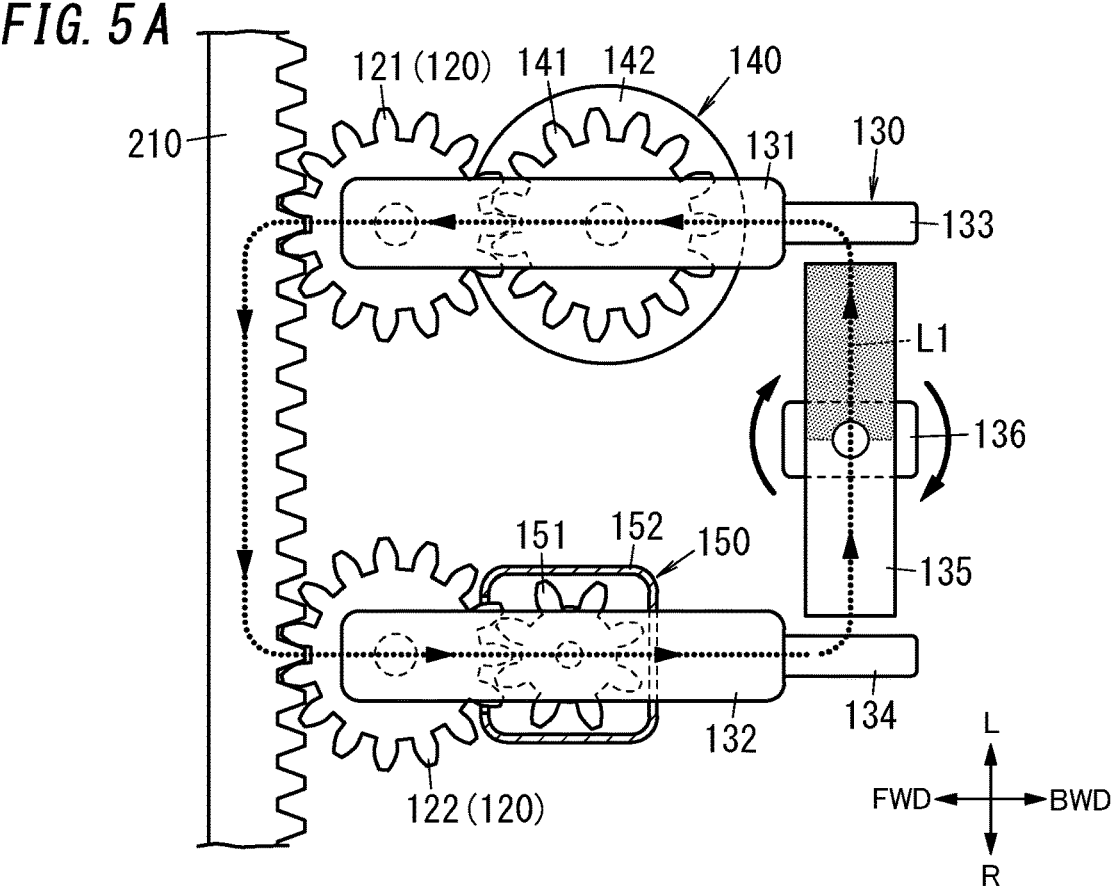
FIG. 5A illustrates a state where a suction unit of the mover is sucked to the object.
Figure 5B:
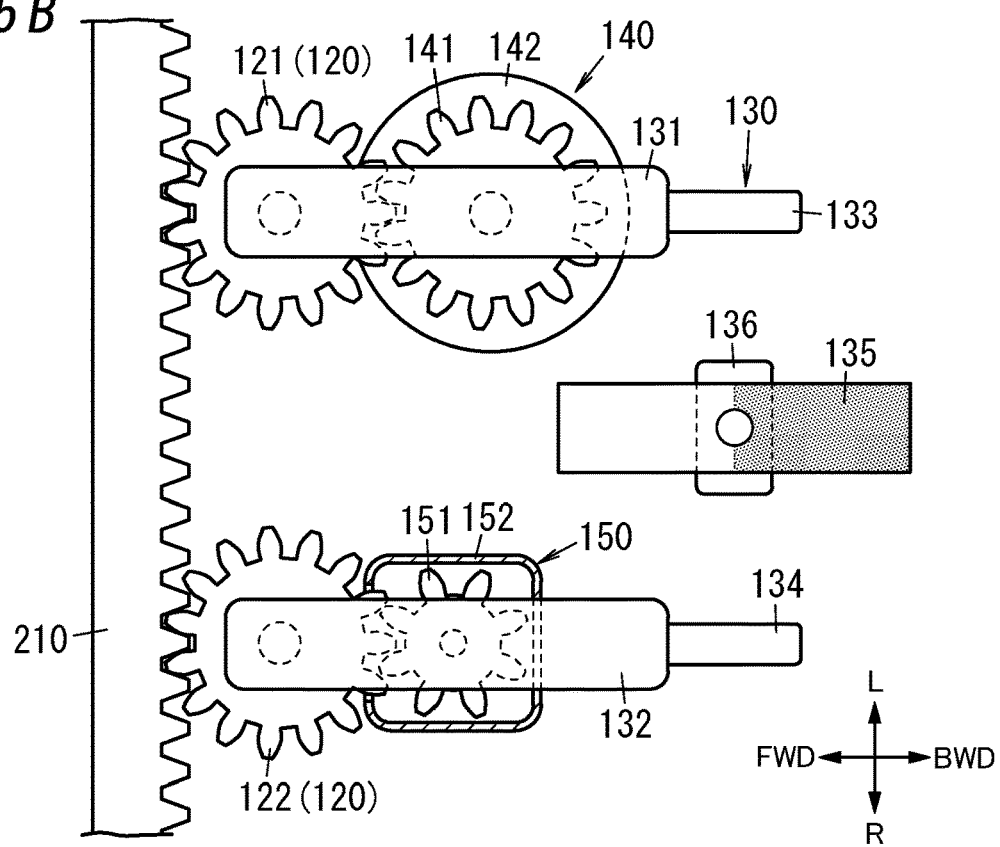
FIG. 5B illustrates a state where the suction unit of the mover is not sucked to the object.

FIGS. 5A and 5B illustrate an example of the suction unit 130. The suction unit 130 includes a pair of pinion gears 121 and 122, a pair of supporting members 131 and 132, a pair of yokes 133 and 134, a permanent magnet 135, and a motor 136. That is to say, the second members (including the pinion gears 121 and 122) also form parts of the suction unit.

The supporting member 131 is made of a magnetic material (such as a metallic material), supports the shaft of the pinion gear 121, and is fixed to the body 110. The supporting member 132 is made of a magnetic material (such as a metallic material), supports the shaft of the pinion gear 122, and is fixed to the body 110.

The pair of yokes 133 and 134 are made of a magnetic material and formed in a rectangular parallelepiped shape. One longitudinal end of the yoke 133 is fixed to the supporting member 131. One longitudinal end of the yoke 134 is fixed to the supporting member 132.

The permanent magnet 135 is supported by the body 110 so as to be rotatable from the first position shown in FIG. 5A to the second position shown in FIG. 5B, and vice versa. When the permanent magnet 135 is located at the first position, one magnetic pole of the permanent magnet 135 faces the yoke 133 and the other magnetic pole of the permanent magnet 135 faces the yoke 134. The second position is a position of the permanent magnet 135 that has turned approximately 90 degrees from the first position within a horizontal plane.

When the permanent magnet 135 is located at the first position, magnetic lines of force emitted from the permanent magnet 135 form a magnetic closed loop L1 (see FIG. 5A) that passes through the yokes 133 and 134, the supporting members 131 and 132, the pinion gears 121 and 122, and the rack 210. This allows the body 110 to be sucked onto the object 200 due to the magnetic force of the permanent magnet 135, thus maintaining the state where the pinion gears 121 and 122 are combined with the rack 210. That is to say, the suction unit 130 is sucked to the object 200 by forming the magnetic closed loop L1 including at least the first member (i.e., the rack 210) and the second members (i.e., the pinion gears 121 and 122).

On the other hand, when the permanent magnet 135 is located at the second position, the magnetic poles at both ends of the permanent magnet 135 are out of contact with the yokes 133 and 134 to cause a decline in the magnetic force between the pinion gears 121 and 122 and the rack 210. This make the suction unit 130 not sucked to the object 200. Moving the body 110 of the mover 100 away from the object 200 in such a state makes the pinion gears 121 and 122 uncombined with the rack 210.

The motor 136 may be implemented as a stepping motor, for example, and has the output shaft thereof coupled to a longitudinal middle portion of the permanent magnet 135. In accordance with a control signal from the control unit 101, the motor 136 rotates the permanent magnet 135 to either the first position or the second position. When the control unit 101 drives the motor 136 to rotate the permanent magnet 135 to the first position in the state where the pinion gears 121 and 122 are in contact with the rack 210 (i.e., in the state where their teeth are in mesh with each other), the suction unit 130 is sucked to the object 200 due to the magnetic force produced by the permanent magnet 135. On the other hand, when the control unit 101 drives the motor 136 to rotate the permanent magnet 135 to the second position in the state where the suction unit 130 is sucked to the object 200, the suction force of the suction unit 130 to the object 200 decreases. This allows the mover 100 to come out of contact with the object 200 easily.

The location detection unit 140 detects the location of the body 110 with respect to the object 200 by detecting the movement of the pinion gears 121 and 122 as the second members. As shown in FIGS. 5A and 5B, the location detection unit 140 includes a gear 141 meshed with the pinion gear 121, out of the pair of pinion gears 121 and 122, and a rotary encoder 142 (rotation detection unit), of which the input shaft is coupled to the gear 141. As the pinion gear 121 rotates, the rotation of the pinion gear 121 is transmitted to the input shaft of the rotary encoder 142 via the gear 141. This allows the rotary encoder 142 to detect the angle of rotation of the pinion gear 121. Thus, the location detection unit 140 is able to detect the movement of the pinion gear 121 in accordance with the result of detection by the rotary encoder 142 and also detect the location of the body 110 with respect to the object 200 based on the movement of the pinion gear 121. That is to say, the location detection unit 140 includes a rotation detection unit (rotary encoder 142) for detecting the rotation of the pinion gear 121, and detects the location of the body 110 with respect to the object 200 based on the angle of rotation, detected by the rotation detection unit (rotary encoder 142), of the pinion gear 121. In this embodiment, the rotation of the pinion gear 121 is transmitted to the rotary encoder 142 via the gear 141. However, this is only an example and should not be construed as limiting. Alternatively, the rotation of the pinion gear 121 may also be transmitted to the input shaft of the rotary encoder 142 via a belt, a chain, or any other suitable member.

The driving unit 150 drives the pinion gear 122, out of the pair of pinion gears 121 and 122 as the second members. That is to say, the second moving part includes the driving unit 150 for driving the second members. As shown in FIGS. 5A and 5B, the driving unit 150 includes a gear 151 meshed with the pinion gear 122, and an electric motor 152, of which the output shaft is coupled to the gear 151. The driving unit 150 turns the electric motor 152 in accordance with a control signal supplied from the control unit 101, thus transmitting the rotation of the electric motor 152 to the pinion gear 122 via the gear 151. Thus, the driving unit's 150 driving the pinion gear 122 as the second member in the state where the rack 210 is combined with the pinion gears 121 and 122 allows the body 110 to be displaced relative to the object 200. In this embodiment, the rotation of the electric motor 152 is transmitted to the pinion gear 122 via the gear 151. However, this is only an example and should not be construed as limiting. Alternatively, the rotation of the electric motor 152 may also be transmitted to the input shaft of the pinion gear 122 via a belt, a chain, or any other suitable member.

(2.2) Operation

Next, it will be described with reference to FIGS. 6A-6D how the mover 100 performs the operation of approaching the shelving as the object 200 to unload a burden 400 from itself onto one of the shelves thereof, being loaded with another burden 400 removed from a different position of the shelving (which may or may not be located on the same shelf of the shelving), and then moving on.

Figure 6A:
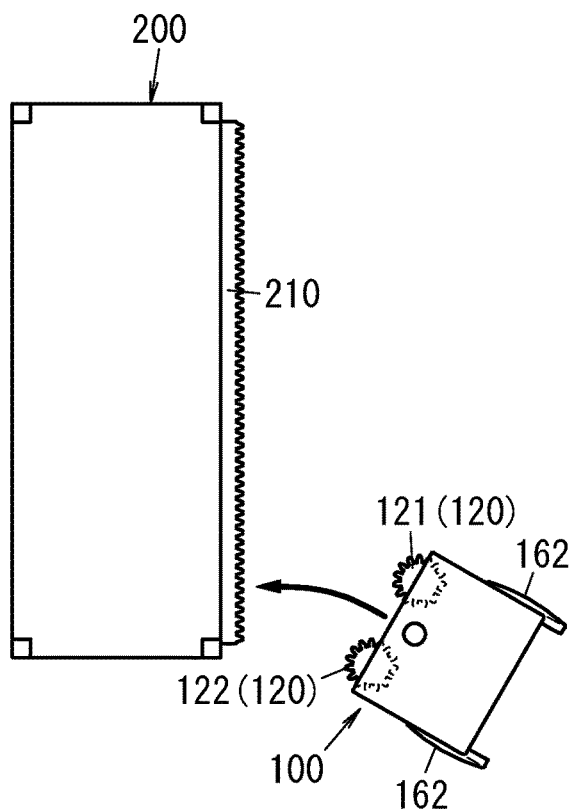
FIG. 6A illustrates how the mover approaches the object in the moving system.

The control unit 101 of the mover 100 controls the traveling device 160 in accordance with the current location detected by the sensor 180 and by reference to the map information stored in the memory to make the mover 100 travel toward the object 200 as shown in FIG. 6A.

Figure 6B:
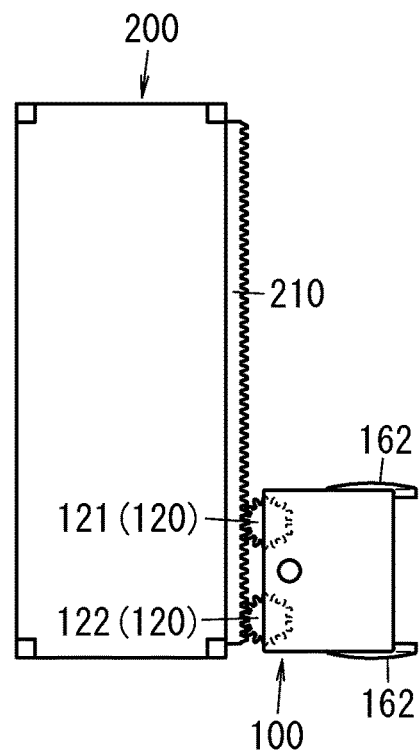
FIG. 6B illustrates how the mover is combined with the object in the moving system.

On sensing the mover 100 approach the object 200, the control unit 101 makes the mover 100 go toward the object 200 such that the pinion gear 120 is combined (meshed) with the rack 210 at one end (e.g., a right end) thereof, as shown in FIG. 6B.

On detecting, in accordance with image data provided by the sensor 180, for example, that the pinion gears 120 are now in contact with the rack 210, the control unit 101 controls the motor 136 of the suction unit 130 to move the permanent magnet 135 from the second position to the first position. This allows the suction unit 130 to be sucked onto the object 200 due to the magnetic force of the permanent magnet 135.

In this state, the control unit 101 controls the electric motor 152 of the driving unit 150 to rotate the pinion gear 122, thereby displacing the body 110 relative to the object 200 toward a desired unloading position.

As the body 110 is displaced relative to the object 200, the pinion gear 121 rotates, which turns the input shaft of the rotary encoder 142 accordingly. This allows the location detection unit 140 to detect the movement of the pinion gear 122 and thereby detect the location of the body 110 with respect to the object 200.

On determining, based on the result of detection by the location detection unit 140, that the body 110 has reached the unloading position, the control unit 101 stops running the driving unit 150 and controls the loading and unloading device 170 to unload the burden 400 onto a shelf 201.

Next, the control unit 101 controls the electric motor 152 of the driving unit 150 to rotate pinion gear 122, thereby displacing the body 110 relative to the object 200 toward a desired loading position.

Figure 6C:
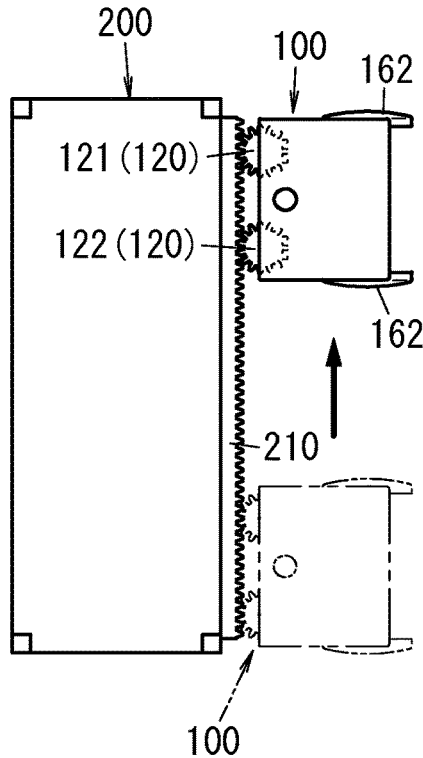
FIG. 6C illustrates how the mover is displaced relative to the object in the moving system.
Figure 6D:
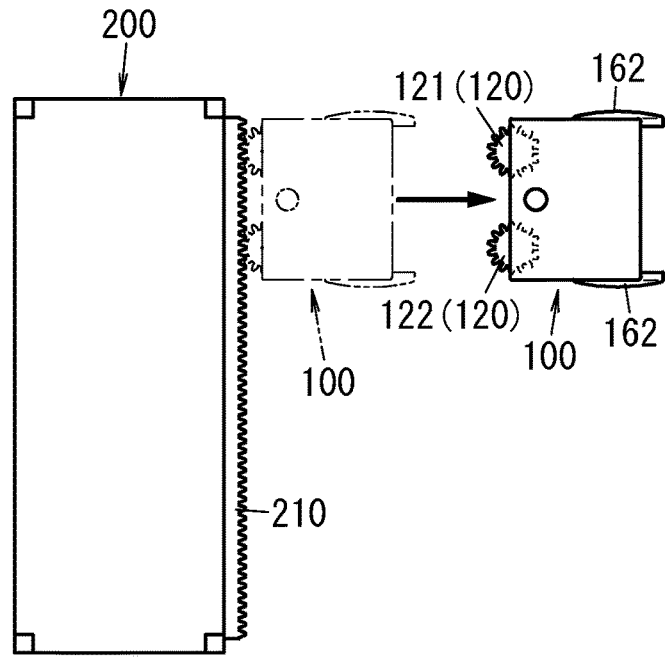
FIG. 6D illustrates how the mover moves away from the object in the moving system.

On determining, based on the result of detection by the location detection unit 140, that the body 110 has reached the loading position, the control unit 101 stops running the driving unit 150 and controls the loading and unloading device 170 to remove the burden 400 from the shelf 201 (see FIG. 6C).

Thereafter, the control unit 101 controls the motor 136 of the suction unit 130 to move the permanent magnet 135 from the first position to the second position and makes the suction unit 130 no longer sucked to the object 200. That is to say, the control unit 101 performs cancelation processing of canceling the state where the mover 100 is combined with the object 200. In this state, the control unit 101 controls the traveling device 160 to make the body 110 retreat and travel toward the next destination.

As can be seen, in the mover 100 according to this embodiment, the control unit 101 controls the driving unit 150 in accordance with the result of detection by the location detection unit 140. The location detection unit 140 has improved location detection accuracy, which improves the positioning accuracy as well.

In the foregoing description, it has been described how the mover 100 performs the operation of approaching the shelving as the object 200, unloading the burden 400 from itself onto a shelf of the shelving, being loaded with another burden 400 removed from a different position of the shelving, and then moving on. However, this is not the only operation of the mover 100. Optionally, the mover 100 may perform either the operation of approaching the shelving as the object 200 to unload the burden 400 from itself onto a shelf thereof, or the operation of removing a burden 400 from a shelf and moving to somewhere else.

(3) Variations

Note that the embodiment described above is just one of various embodiments of the present disclosure and should not be construed as limiting. Rather, the embodiment described above may be modified, changed, replaced, or combined with any other embodiment in various manners, depending on a design choice or any other factor, without departing from a true spirit or scope of the present disclosure.

Variations of the embodiment described above will be enumerated one after another. Any of the variations to be described below may be adopted in combination as appropriate.

The functions of the mover 100 according to the exemplary embodiment described above are also implementable as a moving method, a computer program, or a non-transitory storage medium that stores the computer program. A moving method according to an aspect includes: first moving processing; suction processing; second moving processing; and detection processing. The first moving processing includes moving the mover 100 until a state where the mover 100 is combined with the object 200 is established. The suction processing includes having the mover 100 sucked to the object 200 in the state where the mover 100 is combined with the object 200. The second moving processing includes displacing the mover 100 relative to the object 200 with the mover 100 sucked to the object 200. The detection processing includes detecting the location of the mover 100 with respect to the object 200. The moving method may further include cancelation processing of canceling the state where the mover 100 is combined with the object 200. A (computer) program according to another aspect is designed to make a computer system execute the moving method described above.

The agent that carries out the functions of the mover 100 according to the present disclosure includes a computer system. In that case, the computer system may include, as principal hardware components, a processor and a memory. The functions of the mover 100 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (ULSI). Optionally, a field-programmable gate array (FPGA) to be programmed after an LSI has been fabricated or a logic device allowing the connections or circuit sections inside of an LSI to be reconstructed may also be adopted as the processor. Those electronic circuits may be either integrated together on a single chip or distributed on multiple chips without limitation. Those multiple chips may be integrated together in a single device or distributed in multiple devices without limitation. As used herein, the "computer system" may also be a microcontroller including at least one processor and at least one memory. Thus, the microcontroller may also be made up of a single or a plurality of electronic circuits including a semiconductor integrated circuit (IC) or a largescale integrated circuit (LSI).

Also, in the embodiment described above, the mover 100 is implemented as a single device with various functions thereof implemented in a single housing (body 110). However, this is only an example and should not be construed as limiting. Alternatively, those functions of the mover 100 may be distributed in multiple different devices. For example, the control unit 101 of the mover 100 may be implemented as a cloud computing system as well.

(3.1) First Variation

Figure 7:
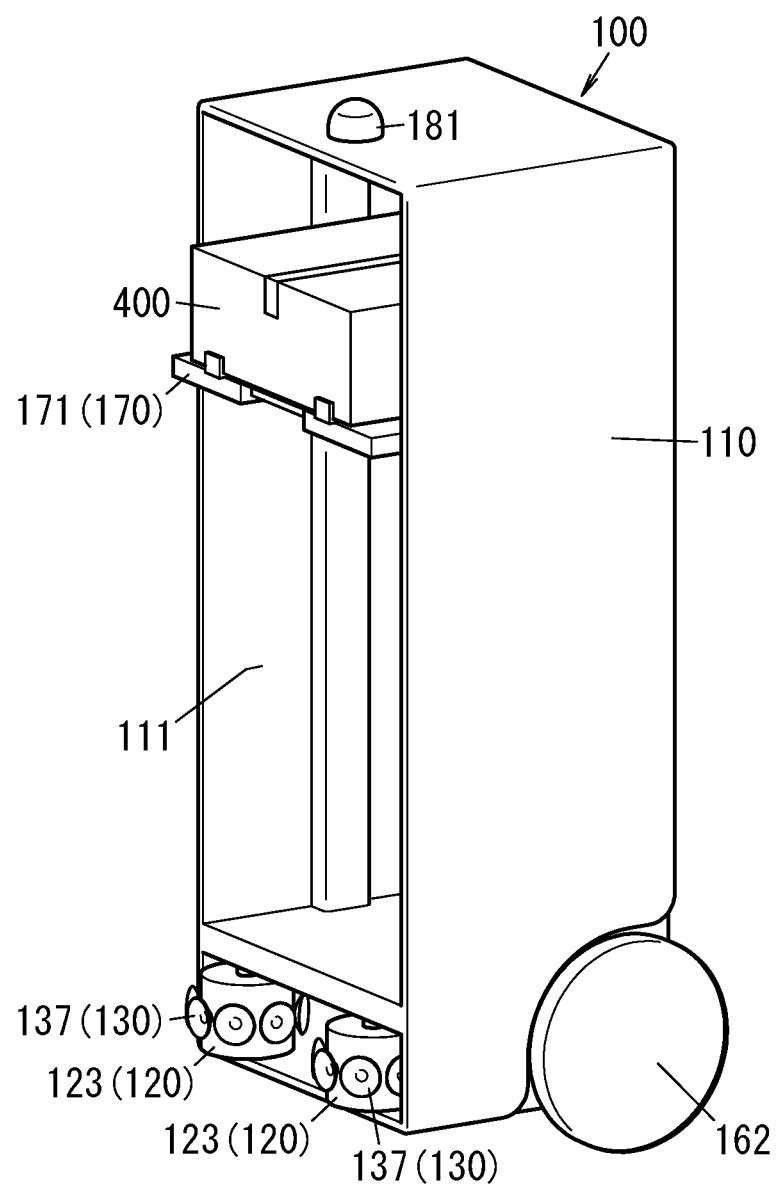
FIG. 7 is a perspective view illustrating the appearance of a mover according to a first variation of the exemplary embodiment of the present disclosure.
Figure 8:
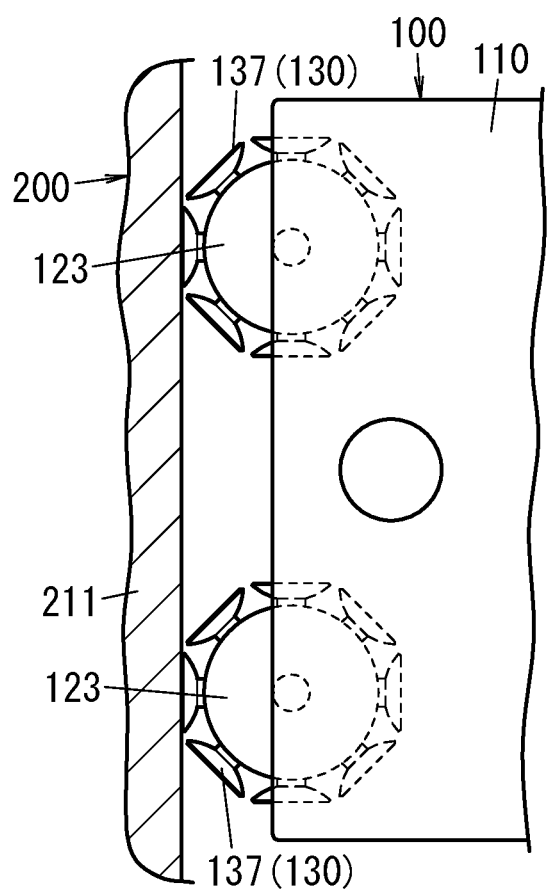
FIG. 8 illustrates a suction unit of the mover according to the first variation of the exemplary embodiment.

FIGS. 7 and 8 illustrate a first exemplary variation. In the mover 100 according to this first variation, the suction unit 130 is sucked with sucking disks 137 to the object 200, which is a major difference from the embodiment described above. Other than the suction unit 130, the mover 100 according to the first variation has the same configuration as the embodiment described above, and detailed description thereof will be omitted herein.

The mover 100 according to the first variation includes, as second members, a pair of rotors 123 mounted rotatably to the body 110.

On the peripheral surface of the pair of rotors 123, arranged at regular intervals are a plurality of sucking disks 137, which together form the suction unit 130.

On the other hand, the object 200 includes, as the first member, a flat plate portion 211 with a flat surface.

In the mover 100 according to this first variation, when approaching the object 200, the sucking disks 137 provided for the pair of rotors 123 are sucked to the flat plate portion 211 of the object 200, thus sucking the mover 100 to the object 200. Making the mover 100 move along the surface of the flat plate portion 211 in this state causes the rotors 123 to rotate, thus peeling and releasing one side of the sucked one of the sucking disks 137 and having the next one of the sucking disks 137 sucked onto the flat plate portion 211. This allows the mover 100 to move along the object 200 in a state where the sucking disks 137 as the second members are combined with the flat plate portion 211 as the first member. Meanwhile, moving the mover 100 away from the object 200 causes the sucking disks 137 to be released from the object 200, thus allowing the mover 100 to come out of contact with the object 200.

(3.2) Other Variations

In the exemplary embodiment and first variation described above, the suction unit 130 is sucked to the object 200 either with the magnetic force produced by the permanent magnet 135 or with the sucking disks 137. However, this is only an example and should not be construed as limiting.

Alternatively, the suction unit 130 may also be sucked to the object 200 with the magnetic force produced by an electromagnetic device. Still alternatively, the suction unit 130 may also be sucked with electrostatic force. Still alternatively, the suction unit 130 may also be a vacuum sucker to be sucked to the object 200 by sucking the air and thereby generating negative pressure. Yet alternatively, the suction unit 130 may also be a Bernoulli sucker to be sucked to the object 200 by blowing off a fluid (such as the air) to produce a whirling flow and thereby generating negative pressure.

In the exemplary embodiment described above, the first member is the rack 210 and the second members are pinion gears 120. However, this is only an example and should not be construed as limiting. Alternatively, any mechanism for converting linear movement into rotational movement may be used as the first member and the second members. For example, a helical rack and helical gears may also be used in combination as the first member and the second members, respectively.

Furthermore, in the embodiment described above, the mover 100 includes not only the traveling device 160 but also the driving unit 150. However, this is only an example and should not be construed as limiting. Alternatively, the second moving part may include the traveling device 160 that allows the body 110 to travel. In that case, the body 110 is displaced relative to the object 200 by the traveling device 160 that allows the body 110 to travel in the state where the first member and the second members are combined with each other.

In that case, the driving unit 150 is not needed and the second member will be used only to detect the location.

Furthermore, in the embodiment described above, the shelves 201 of the shelving as the object 200 are rectangular plates, and therefore, the first member is the linear rack 210. However, the shape of the first member may be changed as appropriate according to the shape of the object 200. For example, the first member (rack 210) may be formed to have a curved shape.

(Resume)

As can be seen from the foregoing description, a mover (100) according to a first aspect includes: a body (110) to move; a second member (120, 123); a suction unit (130); a location detection unit (140); a first moving part (160), and a second moving part (150, 160). The second member (120, 123) moves, in a state where the second member (120, 123) is combined with a first member (210, 211) provided for an object (200), as the body (110) is displaced relative to the object (200). The suction unit (130) is sucked to the object (200) in the state where the second member (120, 123) is combined with the first member (210, 211). The location detection unit (140) detects a location of the body (110) with respect to the object (200) by detecting movement of the second member (120, 123). The first moving part (160) moves the body (110) such that the state where the second member (120, 123) is combined with the first member (210, 211) is established. The second moving part (150, 160) displaces the body (110) relative to the object (200) in the state where the second member (120, 123) is combined with the first member (210, 211).

This aspect allows the location detection unit (140) to detect, along the length of the object (200), the location of the body (110) with respect to the object (200) in a state where the second member (120, 123) is combined with the first member (210, 211). This allows the location detection unit (140) to more accurately detect the location of the body (110) with respect to the object (200) than in a state where the interval between the object (200) and the body (110) is indefinite.

In a mover (100) according to a second aspect, which may be implemented in conjunction with the first aspect, the second member (120, 123) forms part of the suction unit (130).

This aspect allows the second member (120, 123) to be used as a part of the suction unit (130) as well.

In a mover (100) according to a third aspect, which may be implemented in conjunction with the first or second aspect, the suction unit (130) is magnetically sucked to the object (200).

This aspect allows the state where the second member (120, 123) is combined with the first member (210, 211) to be maintained with magnetic attraction.

In a mover (100) according to a fourth aspect, which may be implemented in conjunction with the third aspect, the suction unit (130) is sucked to the object (200) by forming a magnetic closed loop including at least the first member (210, 211) and the second member (120, 123).

This aspect allows the state where the second member (120, 123) is combined with the first member (210, 211) to be maintained with magnetic attraction.

In a mover (100) according to a fifth aspect, which may be implemented in conjunction with any one of the first to fourth aspects, the second member (120, 123) includes a plurality of second members (120, 123). The plurality of second members (120, 123) are arranged in a direction in which the body (110) is displaced relative to the object (200), in the state where the plurality of second members (120, 123) are combined with the first member (210, 211).

This aspect allows the body (110) to be displaced relative to the object (200) in a state where the plurality of second members (120, 123) are combined with the first member (210, 211), thus stabilizing the orientation of the body (110).

In a mover (100) according to a sixth aspect, which may be implemented in conjunction with any one of the first to fifth aspects, the first member (210, 211) is a rack (210) provided for the object (200). The second member (120, 123) is a pinion gear (120) to be combined with the rack (210). The location detection unit (140) includes a rotation detection unit (142) to detect an angle of rotation of the pinion gear (120). The location detection unit (140) detects the location of the body (110) with respect to the object (200) based on the angle of rotation, detected by the rotation detection unit (142), of the pinion gear (120).

This aspect allows the location detection unit (140) to more accurately detect the location of the body (110) with respect to the object (200).

In a mover (100) according to a seventh aspect, which may be implemented in conjunction with any one of the first to sixth aspects, the second moving part (150, 160) includes a driving unit (150) to drive the second member (120, 123). The body (110) is displaced relative to the object (200) by making the driving unit (150) drive the second member (120, 123) in the state where the second member (120, 123) is combined with the first member (210, 211).

This aspect allows the body (110) to be displaced relative to the object (200) by making the driving unit (150) drive the second member (120, 123).

A mover (100) according to an eighth aspect, which may be implemented in conjunction with the seventh aspect, further includes a control unit (101) configured to control the driving unit (150) in accordance with a result of detection by the location detection unit (140).

This aspect allows the location of the body (110) to be detected more accurately by having the control unit (101) control the driving unit (150) based on the result of detection by the location detection unit (140).

In a mover (100) according to a ninth aspect, which may be implemented in conjunction with any one of the first to sixth aspects, the second moving part includes a traveling device (160) to make the body (110) travel. The body (110) is displaced relative to the object (200) by allowing the traveling device (160) to move the body (110) in the state where the second member (120, 123) is combined with the first member (210, 211).

This aspect eliminates the need of providing any additional driving unit (150) separately from the traveling device (160) by making the traveling device (160) displace the body (110) relative to the object (200).

A carrier (100) according to a tenth aspect carries a burden (400) using the mover (100) according to any one of the first to ninth aspects. The body (110) includes a holder (171) to hold the burden (400).

This aspect provides a carrier (100) with the ability to more accurately detect the location of the body (110) with respect to the object (200).

A moving system (1) according to an eleventh aspect includes: the mover (100) according to any one of the first to ninth aspects; and the object (200).

This aspect provides a moving system (1) with the ability to more accurately detect the location of the body (110) with respect to the object (200).

In a moving system (1) according to a twelfth aspect, which may be implemented in conjunction with the eleventh aspect, the body (110) of the mover (100) includes a holder (171) to hold a burden (400), and the object (200) is shelving to put the burden (400) thereon.

In a moving system (1) according to a thirteenth aspect, which may be implemented in conjunction with the twelfth aspect, the first member (210, 211) is provided for a lower part of the shelving.

A moving method according to a fourteenth aspect includes: first moving processing; suction processing; second moving processing; and detection processing. The first moving processing includes moving a mover (100) until a state where the mover (100) is combined with an object (200) is established. The suction processing includes having the mover (100) sucked to the object (200) in the state where the mover (100) is combined with the object (200). The second moving processing includes displacing the mover (100) relative to the object (200) with the mover (100) sucked to the object (200). The detection processing includes detecting a location of the mover (100) with respect to the object (200).

This aspect allows the mover (100) to be displaced relative to the object (200) in a state where the mover (100) is combined with the object (200) to detect the location of the mover (100) with respect to the object (200). This allows the location of the mover (100) to be detected more accurately than in a state where the interval between the object (200) and the body (110) is indefinite.

A moving method according to a fifteenth aspect, which may be implemented in conjunction with the fourteenth aspect, further includes cancelation processing of canceling the state where the mover (100) is combined with the object (200).

This aspect allows the mover (100) to move freely by canceling the state where the mover (100) is combined with the object (200).

Note that the configurations according to the second to ninth aspects are not essential constituent elements of the mover (100) but may be omitted as appropriate.

The invention claimed is:

1. A mover comprising:
a body configured to move;
a second member configured to move in a state where the second member is combined with a first member provided for an object, as the body is displaced relative to the object;
a suction unit configured to be sucked to the object in the state where the second member is combined with the first member;
a location detection unit configured to detect a location of the body with respect to the object by detecting movement of the second member;
a first moving part configured to move the body until the state where the second member is combined with the first member is established; and
a second moving part configured to displace the body relative to the object in the state where the second member is combined with the first member.

2. The mover of claim 1, wherein
the second member includes a plurality of second members, and
the plurality of second members are arranged in a direction in which the body is displaced relative to the object, in a state where the plurality of second members are combined with the first member.

3. The mover of claim 1, wherein
the first member is a rack provided for the object,
the second member is a pinion gear to be combined with the rack,
the location detection unit includes a rotation detection unit configured to detect an angle of rotation of the pinion gear, and
the location detection unit is configured to detect the location of the body with respect to the object based on the angle of rotation, detected by the rotation detection unit, of the pinion gear.

4. The mover of claim 1, wherein
the second moving part includes a traveling device configured to make the body travel, and
the body is displaced relative to the object by allowing the traveling device to move the body in the state where the second member is combined with the first member.

5. The mover of claim 1,
configured with a carrier to carry a burden with the mover, the body including a holder configured to hold the burden.

6. The mover of claim 1, wherein
the first member is a rack provided for the object,
the second member is a pinion gear to be combined with the rack,
the location detection unit includes a rotation detection unit configured to detect an angle of rotation of the pinion gear,
the location detection unit is configured to detect the location of the body with respect to the object based on the angle of rotation, detected by the rotation detection unit, of the pinion gear, and
the suction unit is configured to be magnetically sucked to the object.

7. The mover of claim 1, wherein
the second moving part includes a driving unit configured to drive the second member, and
the body is displaced relative to the object by making the driving unit drive the second member in the state where the second member is combined with the first member.

8. The mover of claim 7, further comprising a control unit configured to control the driving unit in accordance with a result of detection by the location detection unit.

9. The mover of claim 1, wherein
the suction unit is configured to be magnetically sucked to the object.

10. The mover of claim 9, wherein
the suction unit is configured to be sucked to the object by forming a magnetic closed loop including at least the first member and the second member.

11. The mover of claim 9, wherein
the second member includes a plurality of second members, and the plurality of second members are arranged in a direction in which the body is displaced relative to the object, in a state where the plurality of second members are combined with the first member.

12. The mover of claim 1, wherein
the second member is configured to form part of the suction unit.

13. The mover of claim 12, wherein
the suction unit is configured to be magnetically sucked to the object.

14. The mover of claim 12, wherein
the second member includes a plurality of second members, and
the plurality of second members are arranged in a direction in which the body is displaced relative to the object, in a state where the plurality of second members are combined with the first member.

15. The mover of claim 12, wherein
the first member is a rack provided for the object,
the second member is a pinion gear to be combined with the rack,
the location detection unit includes a rotation detection unit configured to detect an angle of rotation of the pinion gear, and
the location detection unit is configured to detect the location of the body with respect to the object based on the angle of rotation, detected by the rotation detection unit, of the pinion gear.

16. A moving system comprising:
a mover, the mover comprising:
   a body configured to move;
   a second member configured to move in a state where the second member is combined with a first member provided for an object, as the body is displaced relative to the object;
   a suction unit configured to be sucked to the object in the state where the second member is combined with the first member;
   a location detection unit configured to detect a location of the body with respect to the object by detecting movement of the second member;
   a first moving part configured to move the body until the state where the second member is combined with the first member is established; and
   a second moving part configured to displace the body relative to the object in the state where the second member is combined with the first member; and
the object.

17. The moving system of claim 16, wherein
the body of the mover includes a holder configured to hold a burden, and
the object is shelving configured to put the burden thereon.

18. The moving system of claim 17, wherein
the first member is provided for a lower part of the shelving.

19. A moving method comprising:
first moving processing of moving a mover until a state where the mover is combined with an object is established;
suction processing of having the mover sucked to the object in the state where the mover is combined with the object;
second moving processing of displacing the mover relative to the object with the mover sucked to the object; and
detection processing of detecting a location of the mover with respect to the object.

20. The moving method of claim 19, further comprising
cancelation processing of canceling the state where the mover is combined with the object.

* * * * *